Patented Mar. 21, 1950

2,501,015

UNITED STATES PATENT OFFICE 2,501,015

PROCESS FOR BREAKING PETROLEUM EMULSIONS

Arthur F. Wirtel, Glendale, Mo., assignor to Petrolite Corporation, Ltd., Wilmington, Del., a corporation of Delaware No Drawing. Application February 16, 1948, Serial No. 8,734. In Venezuela March 7, 1947

11 Claims. (Cl. 252—334)

This invention relates to new chemical products or compositions of matter and to the use and manufacture of the same. The present application is a continuation-in-part of my co-pending application, Serial No. 727,285, filed February 7, 1947, now abandoned.

One object of my invention is to provide new chemical products or compositions that are particularly adapted for breaking or resolving petroleum emulsions and also capable of various other uses as hereinafter described.

Another object of my invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

And still another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification as contemplated in the present application includes the preventive step of commingling the demulsifier with the aqueous component which would or might subsequently become either phase of the emulsion in absence of such precautionary measure. Similarly, such demulsifier may be mixed with the hydrocarbon component.

The product or composition of matter herein contemplated is a mechanical mixture of four different chemical compounds or products and preferably along with a suitable solvent so as to give the mixture desirable physical properties, for instance to render it as a liquid for convenience rather than a solid.

The four types of compounds herein employed to give the combination are the following:

(1) Alkali metal oil soluble petroleum sulfonates, commonly referred to as mahogany petroleum sulfonates or mahogany petroleum soaps;

(2) Ammonium salts of propylated naphthalene mono-sulfonic acids;

(3) Cyclohexylamine salts of propylated naphthalene mono-sulfonic acids, and (4) Certain oxyethylated thermoplastic phenol-aldehyde resins as hereinafter described.

Mahogany soaps are well-known commodities and require no particular description. Mahogany soaps in the form of alkali metal salts, sodium, potassium, or ammonium, are oil soluble and water dispersible.

The manufacture of mahogany soaps, particularly the sodium soap, is described in U. S. Patent 2,403,185, dated July 2, 1946, to Lemmon, Bransky, and Langan in the following language:

"Preferentially oil-soluble sulphonic compounds; namely, sulphonic acids and sulphonates are obtained by the sulphuric acid treatment of hydrocarbon oils, particularly the viscous petroleum oils. In the sulphuric acid treatment of viscous petroleum oils, such as lubricating oils, insulating oils, pale oils, turbine oils, technical white oils, mineral medicinal white oils and the like, the oils are conventionally treated successively with a number of portions of concentrated or fuming sulphuric acid or with $SO_3$. For example, the oil may be treated with portions or 'dumps' of 0.5 pound of fuming sulphuric acid per gallon of oil until the required total quantity of acid has been used, usually from about 3 pounds to about 8 pounds of acid per gallon of oil. After each acid dump the acid sludge produced is permitted to settle and withdrawn before the subsequent portion of acid is added to the oil.

"A variety of sulphur-containing compounds are formed by the chemical reactions which result by the action of the sulphuric acid or $SO_3$ upon the hydrocarbon oil. Among the compounds formed are sulphonic acids, inorganic esters of sulphuric acid, partial esters of sulphuric acid, etc. Most of these compounds are relatively insoluble in the oil under treating conditions and separate from the oil, together with a large portion of the unreacted acid, in the sludge which is withdrawn. Two types of sulphonic acids are formed. Some of the sulphonic acids are preferentially oil-soluble and because of their characteristic reddish mahogany color are commonly referred to in the petroleum art as mahogany acids. Other sulphonic acids are preferentially water-soluble and are largely segregated in the acid sludge layer. These water-soluble sulphonic acids have a characteristic green color and are popularly referred to as green acids.

"Conventionally the acid-treated oil containing oil-soluble sulphonic acids, some $SO_2$ unreacted sulphuric acid, and preferentially water-soluble sulphonic acid, is treated with an alkali, such as caustic soda, caustic potash, ammonia and the like, to neutralize the acidity and to form preferentially oil-soluble sulphonates or the so-called oil-soluble mahogany soaps. The oil-soluble mahogany soaps are then extracted from the oil by means of a suitable solvent such as an alcohol."

The manufacture of alkyl aryl sulfonic acids, particularly propylated naphthalene sulfonic acids is well-known. One type of such acids is indicated by the following formula

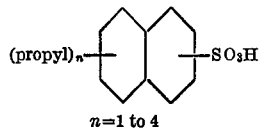

$n = 1$ to $4$

Such products are readily prepared in any one of a number of ways. For instance, propylated naphthalene can be treated with sulfuric acid so as to obtain the corresponding sulfonic acid. Naphthalene sulfonic acid can be propylated with propyl alcohol, propyl hydrogen sulfate propylene, or any other suitable propylating agent. If desired, more than one reaction can be conducted at a single stage; that is, naphthalene, isopropyl alcohol, and sulfuric acid can be reacted to give the desired product. The finished acid indicated by the above formula can be neutralized with any suitable base, such as cyclohexylamine, to give a salt of the following composition:

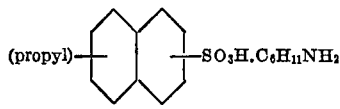

As to the manufacture of such product, see U. S. Patent 2,076,623 dated April 13, 1937, to De Groote, Keiser, Faure and Wirtel.

The acid previously referred to can be neutralized with some other base, for instance ammonia instead of cyclohexylamine to give the corresponding ammonium salt of the following formula:

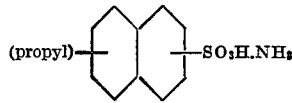

As to the aforementioned oxyethylated thermoplastic phenol-aldehyde resins previously mentioned, reference is made to two co-pending applications of Melvin De Groote and Bernhard Keiser, Serial Numbers, 8,730 and 8,731, both filed February 16, 1948. Application Serial No. 8,730 has now been abandoned. The former describes, among other things, a process for breaking petroleum emulsions by use of certain oxyethylated thermoplastic resins. The latter is concerned with the oxyethylated resins per se and their use in various arts. What is said hereinafter is a substantial repetition of what appears in the first of the two above applications in substantially verbatim form.

In order to avoid the repetitious use of quotation marks, and also in order that the use of the plural personal pronoun may be explained where it occurs, as previously stated, I am simply copying intact from the aforementioned De Groote and Keiser application for the reason that such description appears to be the only completely satisfactory description of one of the ingredients of my mixture. The quoted matter begins with the next paragraph immediately following and is indicated by quotation marks. Likewise, the end of the quoted matter is indicated subsequently in the text by a second and final set of quotation marks.

"We have found that if solvent-soluble resins are prepared from difunctional (direactive) phenols in which one of the reactive (o or p) positions of the phenol is substituted by a hydrocarbon radical having 4 to 8 carbon atoms, in the substantial absence of trifunctional phenols, and aldehydes having not over 8 carbon atoms, subsequent oxyalkylation, and specifically oxyethylation, yields products of unusual value for demulsification purposes, provided that oxyalkylation is continued to the degree that hydrophile properties are imparted to the compound. By 'substantial absence of trifunctional phenols,' we mean that such materials may be present only in amounts so small that they do not interfere with the formation of a solvent-soluble resin product and, especially, of a hydrophile oxyalkylated derivative thereof. The actual amounts to be tolerated will, of course, vary with the nature of the other components of the system; but in general the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

Such products are rarely a single chemical compound but are almost invariably a mixture of cogeners. One useful type of compound may be exemplified in an idealized simplification in the following formula:

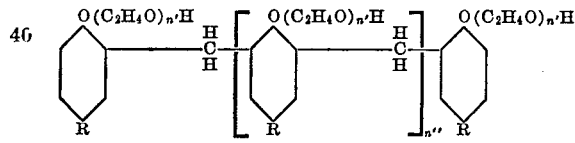

which, in turn, is considered a derivative of the fusible, organic solvent-soluble resin polymer.

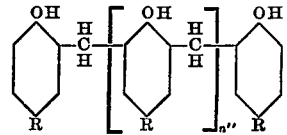

In these formulas $n''$ represents a numeral varying from 1 to 13 or even more, provided that the parent resin is fusible and organic solvent-soluble; $n'$ represents a numeral varying from 1 to 20, with the proviso that the average value of $n'$ be at least 2; and R is a hydrocarbon radical having at least 4 and not over 8 carbon atoms. These numerical values of $n'$ and $n''$ are, of course, on a statistical basis.

The present invention involves the use, as a demulsifier, of a hydrophile oxyalkylated 2, 4, 6 (i. e., 2, 4 or 6) $C_4$- to $C_8$-hydrocarbon substituted monocyclic phenol—$C_1$- to $C_8$-aldehyde resin in which the ratio of oxyalkylene groups to phenolic nuclei is at least 2:1 and the alkylene radicals of the oxyalkylene groups are ethylene, propylene, butylene, hydroxypropylene or hydroxybutylene corresponding to the alpha-beta alkylene oxides, ethylene oxide, alpha-beta propylene oxide, alpha-beta butylene oxide, glycide and methyl glycide.

More particularly the present invention involves the use, as a demulsifier, of a compound having the following characteristics:

(1) Essentially a polymer, probably linear but not necessarily so, having at least 3 and preferably not over 15 or 20 phenolic or structural units. It may have more, as previously stated.

(2) The parent resin polymer being fusible and organic solvent-soluble as hereinafter described.

(3) The parent resin polymer being free from cross-linking, or structure which cross-links during the heating incident to the oxyalkylation procedure to an extent sufficient to prevent the possession of hydrophile or sub-surface-active or surface-active properties by the oxyalkylated resin. Minor proportions of trifunctional phenols sometimes present in commercial difunctional phenols are usually harmless.

(4) Each alkyleneoxy group is introduced at the phenolic hydroxyl position except possibly in an exceptional instance where a stable methylol group has been formed by virtue of resin manufacture in presence of an alkaline catalyst. Such occurrence of a stable methylol radical is the exception rather than the rule, and in any event apparently does not occur when the resin is manufactured in the presence of an acid catalyst.

(5) The total number of alkyleneoxy radicals introduced must be at least equal to twice the phenolic nuclei.

(6) The number of alkyleneoxy radicals introduced not only must meet the minimum of item (5) above but must be sufficient to endow the product with sufficient hydrophile property to have emulsifying properties, or be self-emulsifiable or self-dispersible, or the equivalent as hereinafter described. The invention is concerned particularly with the use of sub-surface-active and surface-active compounds.

(7) The use of a product derived from a para-substituted phenol is advantageous as compared with the use of a product derived from an ortho-substituted phenol, when both are available. This preference is based in part on the fact that the para-substituted phenol is usually cheaper, and also where we have been able to make a comparison it appears to be definitely better, in improving the effectiveness of demulsifiers.

We have found when oxyalkylated derivatives are obtained conforming to the above specifications, particularly in light of what is said hereinafter in greater detail, that they have unusual properties which can be better understood perhaps in light of the following:

(a) The property is not uniformly inherent in every analogous structure for the reason that if the methylene group is replaced by sulfur, for example, we have found such compounds to be of lesser value.

(b) Similarly, the property is not uniformly inherent in every analogous structure for the reason that if R is replaced by some other substituent, for instance chlorine, the compounds obtained are of a reduced value in comparison with the outstanding compounds derived, for example, from difunctional butylphenol, difunctional amylphenol, difunctional octylphenol, etc.

(c) We know of no theoretical explanation of the unusual properties of this particular class of compounds and, as a matter of fact, we have not been able to find a satisfactory explanation even after we have prepared and studied several hundred typical compounds.

We have also found that the remarkable properties of the parent materials as demulsifiers persist in derivatives which bear a simple genetic relationship to the parent material, and in fact to the ultimate resin polymer, for instance, in the products obtained by reaction of the oxyalkylated compounds with low molal monocarboxy acids, high molal monocarboxy acids, polycarboxy acids or their anhydrides, alpha-chloro monocarboxy acids, epichlorohydrin, etc. The derivatives also preferably must be obtained from oxyalkylated products showing at least the necessary hydrophile properties per se.

As previously stated, the present invention is concerned primarily with the resolution of petroleum emulsions of the water-in-oil type by means of certain specified demulsifiers. The specified demulsifiers are the products obtained by the oxyalkylation of certain resins, which in turn are derived by chemical reaction between difunctional monohydric phenols and a reactive aldehyde such as formaldehyde, nearby homologues, and their equivalents. The phenolic reactant is characterized by one ortho-para nuclear hydrocarbon substituent having not less than 4 carbon atoms and not more than 8 carbon atoms. Usually the phenolic reactants are derivatives of hydroxybenzene, i. e., ordinary phenol, and are usually obtained by reaction of phenol with an olefin or an organic chloride in presence of a metallic halide or condensing agent, but similar phenolic reactants obtained from metacresol or 3,5-xylenol are equally satisfactory for the reason that such phenols are still difunctional (direactive) and the presence of the single or even both methyl radicals does not materially affect the sub-surface-activity or the surface-activity or hydrophile balance. The hydrocarbon substituent having 4 to 8 carbon atoms may be alkyl, alkylene, aryl, alicyclic or aralkyl.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde on one hand and a comparable product prepared from the same phenolic reactant and heptaldehyde on the other hand. The former, as shown in certain subsequent examples, is a hard, brittle solid, whereas the latter is soft and tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form vinyl condensations by virtue of its unsaturated structure. The production of resins from furfural for use in preparing products for the present process from furfural is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes although usually this has no advantage.

Resins of the kind which are used as intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction and, in fact, may operate by initial combination with the aldehydic reactant. The compound hexamethylenetetramine illustrates such a combination. In light of these various reactions it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated but also the hydroxides of the alkali metals, hydroxides of the alkaline earth metals, salts of strong bases and weak acids such as sodium acetate, etc.

Suitable phenolic reactants include the following: Para-tertiary-butylphenol; para-secondary-butylphenol; para-tertiary-amylphenol; para-secondary-amylphenol; para-tertiary-hexylphenol; para-isooctylphenol; ortho-phenylphenol; para-phenylphenol; ortho-benzylphenol; para-benzylphenol; and para-cyclohexylphenol, and the corresponding ortho-para substituted metacresols and 3,5-xylenols.

For convenience, the phenol has previously been referred to as monocyclic in order to differentiate from fused nucleus polycyclic phenols, such as substituted napththols. Specifically, 'monocyclic' is limited to the nucleus in which the hydroxyl radical is attached. Broadly speaking, where a substituent is cyclic, particularly aryl, obviously in the usual sense phenol is actually polycyclic although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

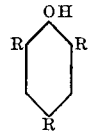

in which R is selected from the class consisting of hydrogen atoms and hydrocarbon radicals having at least 4 carbon atoms and not more than 8 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2, 4, 6 position, again with the provision as to 3 or 3,5-methyl substitution. This is conventional nomenclature, numbering the various positions in the usual clockwise manner, beginning with the hydroxyl position as one:

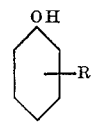

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 8 carbon atoms, is well known. As has been previously pointed out, there is no objection to a methyl radical provided it is present in the 3 or 5 position.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus. Sometimes when higher aldehydes are used an excess of aldehydic reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

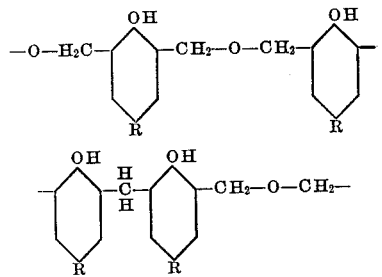

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic methd using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression 'low-stage' resin or 'low-stage' intermediate is employed to mean a stage having 6 or 7 units or even less. In the appended claims we have used 'low-stage' to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see 'Coating and Ink Resins,' page 157, Reinhold Publishing Co., 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfoacid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substitutent approximates the upper limit specified herein, for instance 7 or 8, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins as that term is used herein.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfoacid and a mineral acid as a catalyst, and xylene as a solvent. By way of illustration, certain subsequent examples are included, but it is to be understood the herein described invention is not concerned with the resins per se or with any particular method of manufacture but is concerned with the use of derivatives obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene of metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethylol or a substituted hydroxymethylol group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous, rubbery, or at least not hydrophile. As to the rationale of resinification, note particularly what is said hereafter in differentiating between resoles, Novolaks, and resins obtained solely from difunctional phenols.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment if it is employed as part of resin manufacture.

Our routine procedure in examining a phenol for suitability for preparing products to be used in practicing the invention is to prepare a resin employing formaldehyde in excess (1.2 moles of formaldehyde per mole of phenol) and using an acid catalyst in the manner described hereinafter in Example 1a. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation due to the presence of a small amount of trireactive phenol, as previously mentioned, or for some other reason, it may become extremely insoluble, and no longer qualifies as being hydrophile as herein specified. Increasing the size of the aldehydic nucleus, for instance using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and may lead to cross-linking.

In this connection it may be well to point out that part of these reactions are now understood or explainable to a greater or lesser degree in light of a most recent investigation. Reference is made to the researches of Zinke and his co-workers, Hultzsch and his associates, and to von Eulen and his co-workers, and others. As to a bibliography of such investigations, see Carswell, 'Phenoplasts,' chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a 'most typical type' of fusible resin and forget for the time that such resin, at least under certain circumstances, is susceptible to further complications. Subsequently in the text it will be pointed out that cross-linking or reaction with excess formaldehyde may take place even with one of such 'most typical type' resins. This point is made for the reason that insolubles must be avoided in order to obtain the products herein contemplated for use as demulsifying agents.

The 'typical type' of fusible resin obtained from a para-blocked or ortho-blocked phenol is clearly differentiated from the Novolak type or resole type of resin. Unlike the resole type, such 'typical type' para-blocked or ortho-blocked phenol resin may be heated indefinitely without passing into an infusible stage, and in this respect is similar to a Novolak. Unlike the Novolak type the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as for example the use of two moles of formaldehyde to one of phenol, along with an alkaline catalyst. This peculiar hardening or curing or cross-linking of resins obtained from difunctional phenols has been recognized by various authorities.

The compounds herein used must be hydrophile or sub-surface-active or surface-active as hereinafter described, and this precludes the formation of insolubles during resin manufacture or the subsequent stage of resin manufacture where heat alone, or heat and vacuum, are employed, or in the oxyalkylation procedure. In its simplest presentation the rationale of resinification involving formaldehyde, for example, and a difunctional phenol would not be expected to form cross-links. However, cross-linking sometimes occurs and it may reach the objectionable stage. However, provided that the preparation of resins simply takes into cognizance the present knowledge of the subject, and employing preliminary, explanatory routine examinations as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups due to the fact that a $CH_2OH$ radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldehyde resins derived from difunctional phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word 'fusible.' Ordinarily a thermoplastic resin is identified as one which can be heated repeatedly and still not lose its thermoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression 'water-insoluble' is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

The invention will be illustrated by the following specific examples, giving specific directions for preparing oxyalkylation-susceptible, water-insoluble, organic solvent-soluble, fusible phenol-aldehyde resins derived from difunctional phenols (Examples 1a–68a), carrying out the oxyalkylation procedure to produce products useful in the practice of the invention (Examples 1b–9b and table) and using the products for demulsification (Examples 1c–3c and table), but it is not limited thereto.

*Example 1a*

| | Grams |
|---|---|
| Para-tertiary butylphenol (1.0 mole) | 150 |
| Formaldehyde, 37% (1.0 mole) | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts include the following:

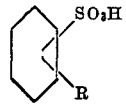

(R is an alkyl hydrocarbon radical having 12–14 carbon atoms.

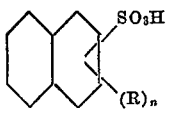

(R is an alkyl radical having 3–12 carbon atoms and $n$ represents the numeral 3, 2, or 1, usually 2, in such instances where R contains less than 8 carbon atoms.

(With respect to alkylaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol, in presence of a strong mineral acid as a catalyst and using formaldehyde, sometimes yields a resin which apparently has a very slight amount of cross-linking. Such resin is similar to the one described above except that it is somewhat opaque, and its melting point is higher than the one described above and there is a tendency to cure. Such a resin is generally dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If following a given procedure with a given lot of the phenol, such a resin is obtained, the amount of catalyst employed is advantageously reduced slightly or the time of reflux reduced slightly, or both, or an acid such as oxalic acid is used instead of hydrochloric acid. Purely as a matter of convenience due to better solubility in xylene, we prefer to use a clear resin but if desired either type may be employed.

*Example 2a*

The same procedure was followed as in Example 1a preceding, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that described in Example 1a, preceding. The solvent-free resin was reddish-amber in color, somewhat opaque but completely xylene-soluble. It was semi-soft or pliable in consistency. See what is said in Example 1a, preceding, in regard to the opaque appearance of the resin. What is said there applies with equal force and effect in the instant example.

*Example 3a*

| | Grams |
|---|---|
| Para-tertiary amylphenol (1.0 mole) | 164 |
| Formaldehyde, 37% (1.0 mole) | 81 |
| HCl | 1.5 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was dark red in color, hard, brittle, with a melting point of 128–140° C. It was xylene-soluble.

*Example 4a*

The phenol employed (164 grams) was para-secondary amyl-phenol, which is a liquid. The procedure followed was the same as that used in Example 1a, preceding. The solvent-free resin was hard and brittle, reddish-black in color and with a melting point of 80–85° C.

*Example 5a*

The phenol employed (164 grams) was a commercially available mixed amylphenol containing approximately 95 parts of para-tertiary amylphenol, and 5 parts of ortho-tertiary amylphenol. It was in the form of a fused solid. The procedure employed was the same as that used in Example 1a, preceding. The appearance of the resin was substantially the same as that of the product of Example 3a.

Sometimes resins produced from para-tertiary amylphenol and formaldehyde in the presence of an acid catalyst show a slight insolubility in xylene; that is, while completely soluble in hot xylene to give a clear solution they give a turbid solution in cold xylene. Such turbidity or lack of solubility disappears on heating, or on the addition of diethylethyleneglycol.

We have never noticed this characteristic property when using the commercial phenol of Example 5a which, as stated, is a mixture containing 95% para-tertiary amylphenol and 5% ortho-tertiary amylphenol. In fact, the addition of 5% to 8% of an ortho-substituted phenol, such as ortho-tertiary amylphenol to any difunctional phenol, such as the conventional para-substituted phenols herein mentioned, usually gives an increase in solubility when the resulting resin is high melting, which is often the case when formaldehyde and an acid catalyst are employed.

*Example 6a*

The phenol employed (164 grams) was ortho-tertiary amylphenol which is a liquid. The procedure followed was the same as that used in Example 1a, and the appearance of the resin was light amber in color and transparent. It was soft to pliable in consistency and xylene-soluble.

*Example 7a*

The phenol employed (178 grams) was para-tertiary hexylphenol. This is a solid at ordinary temperatures. The procedure followed was the same as that used in Example 1a preceding, and the appearance of the resin was substantially the same as that of the resin of Example 3a. The solvent-free resin is slightly opaque in appearance, reddish-amber in color, semi-hard to pliable in consistency, and xylene-soluble.

*Example 8a*

The phenol employed was commercial para-octylphenol. 206 grams of this phenol were employed instead of 164 grams of an amylphenol or 150 grams of a butylphenol and 150 grams of xylene were used instead of 100. Otherwise, the procedure was the same as that used in Example 1a. The solvent-free resin obtained was reddish-amber in color, soft to pliable in consistency, and xylene-soluble.

*Example 9a*

| | Grams |
|---|---|
| Para-phenylphenol | 170 |
| Formaldehyde, 37% | 81 |
| HCl | 1.5 |
| Monoalkyl ($C_{10}$–$C_{20}$, principally $C_{12}$–$C_{14}$) benzene monosulfonic acid sodium salt | .8 |
| Xylene | 150 |
| Diethyleneglycol diethylether | 50 |

This phenol was solid. The phenol, xylene, diethylene glycol diethylether, and hydrochloric acid were mixed together and heated to give complete solution at approximately 140° C. The use of diethyleneglycol diethylether, or some equivalent solvent, was necessary for the reason that this particular phenol is not sufficiently soluble in xylene. Having obtained a complete solution in the manner indicated, it was allowed to cool to approximately 75–80° C. and, thereafter, formaldehyde was added and the procedure was the same as that used in Example 1a.

The final product contained not only xylene but also diethyleneglycol diethylether. Since this latter does not distill out readily (boiling point 189° C.) we did not obtain a solvent-free resin sample but used the product as such for oxyethylation. As pointed out elsewhere, the presence of a solvent is usually desirable in the oxyalkylation step. We have, however, examined a number of para-phenylphenol-formaldehyde acid-catalyzed resins which were hard, brittle resins, and melting in the neighborhood of 150° C. or thereabouts.

When ortho-hydroxydiphenyl is substituted for para-hydroxydiphenyl one can eliminate the diethyleneglycol diethylether and use the procedure described in Example 1a, without modification. Ortho-substituted phenols yield resins which have lower melting points than do the para-substituted phenols and are usually more xylene-soluble than resins obtained from the corresponding para-substituted phenols. The matter of the lower melting point is also illustrated in the case of para-tertiary amylphenol resins in comparison with ortho-tertiary amylphenol resins. The resin obtained from ortho derivative and formaldehyde melts at about 80° C. and upward, whereas the comparable para derivative resin melts at about 160° C. In this instance, both resins are xylene-soluble.

*Example 10a*

The same procedure was employed as in Example 1a, except that para-cyclohexylphenol, 176 grams, was employed along with 150 grams of xylene. This phenol was solid. The resulting resin minus solvents was opaque in appearance, xylene dispersible, amber in color, hard and brittle, with an approximate melting point of 170° C. It was sufficiently curable so as to prohibit distillation.

*Example 11a*

The same procedure was employed as in Example 1a, preceding, using 198 grams of commercial styrylphenol and 150 grams of xylene. Styrylphenol is a white solid. The resin was reddish black in color, hard and brittle, with a melting point of about 80° to 85° C.

*Example 12a*

| | Grams |
|---|---|
| Para-tertiary amylphenol (1.0 mole) | 164 |
| Formaldehyde, 37% (0.8 mole) | 64.8 |
| Glyoxal 30% (0.1 mole) | 20.0 |
| Concentrated HCl | 2 |
| Monoalkyl ($C_{10}$–$C_{20}$, principally $C_{12}$–$C_{14}$) benzene monosulfonic acid sodium salt | .75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

Example 13a

| | Grams |
|---|---|
| Para-tertiary amylphenol (1.0 mole) | 164 |
| Glyoxal, 30.2% (0.5 mole) | 96 |
| Concentrated HCl | 2 |
| Monoalkyl ($C_{10}$–$C_{20}$, principally $C_{12}$–$C_{14}$) benzene monosulfonic acid sodium salt | .8 |
| Xylene | 150 |

The same procedure was followed as in Example 1a. There was a modest precipitate of an insoluble material, approximately 15 grams, which had an insoluble sponge-like carbonaceous appearance. It was removed by filtration of the xylene solution as in Example 12a preceding. The resulting solvent-free resin was clear, reddish amber in color, soft to fluid in consistency, and xylene-soluble.

Example 14a

| | Grams |
|---|---|
| Para-tertiary butylphenol (1.0 mole) | 150 |
| Acetaldehyde | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. When a sample of the resin was freed from the solvent, it was dark red, semi-hard or pliable in consistency, and xylene-soluble.

Example 15a

The same procedure was followed as in Example 14a, except that the para-tertiary butylphenol was replaced by an equal amount of para-secondary butylphenol. The appearance of the final resin on a solvent-free basis was substantially identical with the preceding example, except that it was somewhat more fluid in consistency and slightly tacky.

Example 16a

The same procedure was followed as in Example 14a, except that the 150 grams of para-tertiary butylphenol were replaced by 164 grams of para-tertiary amylphenol. The final solvent-free resin was clear and dark red in color. It was xylene-soluble and semi-hard or pliable in consistency.

Example 17a

The same procedure was followed as in Example 16a preceding except that the para-tertiary amylphenol was replaced by an equal amount of para-secondary amylphenol. The appearance of the resin was substantially identical with that of the resin of the preceding example, except that it was somewhat more fluid in consistency and slightly tacky.

Example 18a

The same procedure was followed as in Example 16a except that the amylphenol employed was the phenol described in Example 5a. The appearance of the resin on a solvent-free basis was substantially the same as that of Example 16a.

Example 19a

The same procedure was followed as in Example 16a, except that the amylphenol employed was ortho-tertiary amylphenol. The resin on a solvent-free basis was transparent and reddish-black; it was soft to tacky in consistency and xylene-soluble.

Example 20a

The same procedure was followed as in Example 14a, except that the 150 grams of para-tertiary butylphenol were replaced by 206 grams of commercial para-octylphenol. The solvent-free resin was dark red in color, soft to tacky in consistency, and xylene-soluble.

Example 21a

The same procedure was employed as in Example 14a, except that the 150 grams of para-tertiary butylphenol were replaced by 170 grams of para-phenylphenol. The resin produced was at least dispersible in xylene when hot, giving the appearance of solubility. When the solution was cooled, obvious separation took place. For this reason 100 grams of diethyleneglycol diethylether were added to the finished resin mixture, when hot, so as to give a suitable solution when cold.

A small sample was taken before adding the diethyleneglycol diethylether and the xylene evaporated in order to determine the character of the resin. The solvent-free resin was opaque and reddish-black in color. It was soft and pliable in consistency.

Example 22a

The same procedure was followed as in Example 14a, except that 176 grams of para-cyclohexylphenol were employed instead of the para-tertiary butylphenol. The solvent-free resin was clear, dark red in appearance, soft to pliable in consistency, and xylene-soluble.

Example 23a

The same procedure was followed as in Example 14a, except that the phenol employed was commercial styrylphenol and the amount employed was 198 grams. The resin was soft-to-pliable, reddish-black in color, and xylene-soluble.

Example 24a

| | Grams |
|---|---|
| Para-tertiary amylphenol (1.0 mole) | 164 |
| Heptaldehyde (1.0 mole) | 114 |
| Concentrated $H_2SO_4$ | 2 |
| Xylene | 100 |

The procedure employed was essentially the same as in the Example 14a where acetaldehyde was employed, but with the difference that due to the fact that the particular aldehyde was a higher boiling aldehyde it was not necessary to dilute it with the xylene. For this reason all the xylene was added to the initial mixture, and the higher boiling aldehyde was added by means of the separatory funnel arrangement. Thus, the phenol, acid catalyst, and solvent were combined in a resin pot by the same procedure used as in Example 14a. The resin, after removal of the solvent by distillation, was clear, dark amber in color, had a soft, tacky appearance and was xylene-soluble.

*Example 25a*

| | Grams |
|---|---|
| Para-secondary butylphenol (1.0 mole) | 150 |
| Heptaldehyde (1.0 mole) | 114 |
| Concentrated $H_2SO_4$ | 2 |
| Xylene | 100 |

The same procedure was employed as in Example 24a. The solvent-free resin had physical characteristics similar to those of the resin of Example 24a.

*Example 26a*

| | Grams |
|---|---|
| Para-tertiary butylphenol (1.0 mole) | 150 |
| Heptaldehyde (1.0 mole) | 114 |
| Concentrated $H_2SO_4$ | 2 |
| Xylene | 100 |

This resin was prepared as in Example 24a preceding, with the resulting solvent-free resin being a clear, dark amber color, semi-hard or pliable, and xylene-soluble.

*Example 27a*

| | Grams |
|---|---|
| Para-phenylphenol (1.0 mole) | 170 |
| Heptaldehyde (1.0 mole) | 114 |
| Concentrated $H_2SO_4$ | 2 |
| Xylene | 100 |

The resin was prepared as in Example 24a. The solvent-free resin was slightly opaque, dark amber in color, soft to fluid, and sufficiently xylene-dispersible to permit subsequent oxyalkylation.

*Example 28a*

| | Grams |
|---|---|
| Para-cyclohexylphenol (3.0 moles) | 528 |
| Heptaldehyde (3.0 moles) | 342 |
| Concentrated $H_2SO_4$ | 6 |
| Xylene | 500 |

This resin, made as in Example 24a, in solvent-free form was clear, dark amber to black in color, semi-soft to pliable and xylene-soluble.

*Example 29a*

| | Grams |
|---|---|
| Para-tertiary amylphenol (1.0 mole) | 164 |
| Benzaldehyde (1.0 mole) | 106 |
| Concentrated $H_2SO_4$ | 2 |
| Xylene | 100 |

This resin, made as in Example 24a, in solvent-free form was clear, dark red, hard, brittle, had a melting point of 160–165° C., and was xylene-soluble.

*Example 30a*

| | Grams |
|---|---|
| Para-secondary butylphenol (1.0 mole) | 150 |
| Benzaldehyde (1.0 mole) | 106 |
| Concentrated $H_2SO_4$ | 2 |
| Xylene | 100 |

This resin, made following the procedure employed in Example 24a, in solvent-free form was clear, mahogany in color, semi-hard or pliable and xylene-soluble.

*Example 31a*

| | Grams |
|---|---|
| Para-tertiary butylphenol (1.5 mole) | 225 |
| Benzaldehyde (1.5 mole) | 159 |
| Concentrated $H_2SO_4$ | 3 |
| Xylene | 200 |

The above reactants were combined by the procedure of Example 24a. The solvent-free resin was a clear, hard, brittle, reddish amber colored resin, which was xylene-soluble, and had a melting point of 180–185° C. It was to some degree heat curable.

*Example 32a*

| | Grams |
|---|---|
| Para-phenylphenol (1.5 moles) | 255 |
| Benzaldehyde (1.5 moles) | 159 |
| Concentrated $H_2SO_4$ | 3 |
| Xylene | 200 |

This resin was made as in Example 24a. The resulting solvent-free resin was clear, dark red, hard, and brittle, with a melting point of 200–205° C. It was somewhat heat curable, and almost completely soluble in xylene, with some insoluble material which was dispersible. It was suitable for subsequent oxyalkylation.

*Example 33a*

| | Grams |
|---|---|
| Para-cyclohexylphenol (3.0 moles) | 528 |
| Benzaldehyde (3.0 moles) | 318 |
| Concentrated $H_2SO_4$ | 6 |
| Xylene | 500 |

This resin, formed by combining the above reactants according to the procedure employed in Example 24a, was hard, brittle, xylene-soluble, reddish-black in color, and had a melting point of 165–170° C., with a tendency towards being heat curable.

*Example 34a*

| | Grams |
|---|---|
| Para-tertiary amylphenol (1.0 mole) | 164 |
| Propionaldehyde, 96% (1.0 mole) | 60.5 |
| Concentrated $H_2SO_4$ | 2 |
| Xylene | 150 |

The above reactants were combined according to the procedure followed in Example 24a. The resulting solvent-free resin was clear, dark amber in color, soft to pliable, and xylene-soluble.

*Example 35a*

| | Grams |
|---|---|
| Para-secondary butylphenol | 150 |
| Propionaldehyde, 96% | 60.5 |
| Concentrated $H_2SO_4$ | 2 |
| Xylene | 100 |

This resin was prepared according to the procedure employed in Example 24a. The resulting solvent-free was clear, soft to fluid, dark amber in color, and was xylene-soluble.

Example 36a

| | Grams |
|---|---|
| Para-tertiary butylphenol (1.0 mole) | 150 |
| Propionaldehyde, 96% (1.0 mole) | 60.6 |
| Concentrated $H_2SO_4$ | 2 |
| Xylene | 100 |

This resin was prepared according to the procedure employed in Example 24a. The resulting solvent-free resin was clear, dark amber in color, xylene-soluble, hard and brittle, and has a melting point of 80–85° C.

Example 37a

| | Grams |
|---|---|
| Para-phenylphenol (3.0 moles) | 510 |
| Propionaldehyde, 96% (3.0 moles) | 182 |
| Concentrated $H_2SO_4$ | 6 |
| Xylene | 500 |

The resulting resin, prepared according to the procedure of Example 24a, when solvent-free, was opaque, hard, black, and xylene-insoluble, but sufficiently dispersible in xylene for subsequent oxyalkylation. Addition of a minor proportion of ethyleneglycol diethylether completely solubilized the resin in xylene, a clear solution resulting.

Example 38a

| | Grams |
|---|---|
| Para-cyclohexylphenol (3.0 moles) | 528 |
| Propionaldehyde, 96% (3.0 moles) | 182 |
| Concentrated $H_2SO_4$ | 6 |
| Xylene | 500 |

The resulting resin, prepared according to directions in Example 24a, when solvent-free was clear, dark amber in color, xylene-soluble, hard and brittle, and had a melting point of 84–90° C.

Example 39a

| | Grams |
|---|---|
| Para-tertiary amylphenol | 164 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The resulting solvent-free resin was dark amber to black in color, and soft to fluid in consistency. It was xylene-soluble.

Example 40a

| | Grams |
|---|---|
| Para-tertiary butylphenol | 150 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The appearance of the resin was the same as the resin of the Example 39a.

Example 41a

| | Grams |
|---|---|
| Commercial para-octylphenol | 206 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The appearance of the resin was the same as the resin of Example 39a.

Example 42a

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 1a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

Example 43a

| | Grams |
|---|---|
| Para-tertiary amylphenol | 164 |
| Furfural (carbonate treated) | 70 |
| Potassium carbonate | 3.2 |

The procedure employed was the same as that of Example 42a. The amount of water distilled was 10 cc. and the amount of furfural, 3 cc. The resin was a right black, xylene-soluble resin, semi-pliable to hard.

Example 44a

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

Example 45a

| | Grams |
|---|---|
| Para-secondary butylphenol | 450 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 44a. The resulting solvent-free resin was clear, light amber in color, and semi-fluid or tacky in consistency.

*Example 46a*

| | Grams |
|---|---|
| Para-phenylphenol | 510 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 500 |

The same procedure was employed as in Example 44a, except that the reaction product contained a considerable amount of a white crystalline solid which was alcohol-soluble and xylene-insoluble, necessitating the use of some isopropyl alcohol in effecting a separation. The resulting solvent-free resin had a grayish-white crystalline structure, and was hard, brittle, non-xylene-soluble but soluble in a xylene-diethyleneglycol diethylether mixture. This crystalline structure in phenylphenol resins has been noted in the literature.

*Example 47a*

| | Grams |
|---|---|
| Para-cyclohexylphenol | 528 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 300 |

This resin was made and worked up in the same manner as in Example 46a. The resin, after distillation and standing overnight, developed the same type of crystalline structure noted in the resin of the Example 46a. However, on cooling immediately after distillation, the resulting product was clear, light amber in color, and fairly soft in consistency.

*Example 48a*

| | Grams |
|---|---|
| Para-tertiary butylphenol | 450 |
| Formaldehyde, 30% | 652 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 300 |

The same procedure was followed as in Example 44a. The resulting resin was deep red in color, clear, and soft or semi-fluid in consistency.

*Example 49a*

This resin was prepared as in Example 44a except that the paratertiary amylphenol-formaldehyde ratio was 1 to 1.1 moles. The resulting solvent-free resin was dark red in color, clear, and semi-hard or pliable in consistency.

*Example 50a*

The resin was prepared as in Example 48a except that the paratertiary butylphenol-formaldehyde ratio was 1 to 1.1 moles. The resulting solvent-free resin was dark red in color, clear, hard, brittle, and had a melting point of 100–105° C.

*Example 51a*

| | | |
|---|---|---|
| Commercial para-octyl phenol | grams | 412 |
| Formaldehyde, 30% | do | 220 |
| NaOH in 20 cc. $H_2O$ | do | 4.5 |
| Monoalkyl ($C_{10}$–$C_{20}$, principally $C_{12}$–$C_{14}$) benzene monosulfonic acid sodium salt | grams | 1.5 |
| Xylene | do | 300 |
| Glacial acetic acid | cc | 10 |

This resin was prepared as in Example 44a. A small amount, approximately 1%, of an insoluble, infusible flocculent precipitate was noted dispersed throughout the resinous solution. This was filtered out before distillation. The resin, after vacuum distillation to 150° C. to remove the solvent, was dark red in color, clear, hard and brittle, with a melting point of 113–117° C.

*Example 52a*

Resin of Example 44a was subjected to vacuum distillation to 225° C., at 25 mm. Hg. The resulting product was a hard, brittle resin, xylene-soluble, and having a melting point of 145–150° C.

*Example 53a*

Resin of Example 45a was subjected to vacuum distillation to 225° C., at 25 mm. Hg. The resulting product was hard, brittle, black in color, xylene-insoluble, and infusible up to 220° C. However, if the vacuum distillation was taken to only 175 or 180° C., at 25 mm. Hg the resulting product was xylene-soluble and had a melting point of approximately 170° C.

*Example 54a*

Resin of Example 46a was subjected to vacuum distillation to 225° C., at 25 mm. Hg. The resulting product was opaque or crystalline, xylene-dispersible, and soluble in a mixed solvent of 75% xylene and 25% diethyleneglycol diethylether, with a melting point of 100–105° C.

*Example 55a*

Resin of Example 47a was subjected to vacuum distillation to 225° C., at 25 mm. Hg. The resulting product was opaque or crystalline, dark brown in color, xylene-soluble, and semi-hard or pliable in consistency.

*Example 56a*

Resin of Example 48a was subjected to vacuum distillation to 225° C., at 25 mm. Hg. The resulting product was hard, brittle, partially xylene-insoluble, but soluble in a mixed solvent of 75% xylene and 25% diethyleneglycol diethylether with an approximate melting point of 160–165° C. It was also heat curable.

*Example 57a*

Resin of Example 49a was subjected to vacuum distillation to 225° C. at 25 mm. Hg. The resulting product was dark amber to black in color, xylene-soluble, hard and brittle, with a melting point of 145–150° C.

*Example 58a*

Resin of Example 50a was subjected to vacuum distillation to 225° C., at 25 mm. Hg. The resulting resin was black in color, hard and brittle, xylene-dispersible, and soluble in a mixed solvent of 75% xylene and 25% diethyleneglycol diethylether, with a melting point of 165–170° C. It was also heat curable.

*Example 59a*

Resin of Example 51a was subjected to vacuum distillation to 225° C., at 25 mm. Hg. The resulting resin was dark amber in color, xylene-soluble, hard and brittle, with a melting point of 115–120° C.

Example 60a

| | Grams |
|---|---|
| Commercial para-tertiary amylphenol (described in Example 5a) | 328 |
| Formaldehyde | 352 |
| NaOH in 20 cc. H₂O | 4.5 |
| Monoalkyl (C₁₀–C₂₀, principally C₁₂–C₁₄) benzene monosulfonic acid sodium salt | 1.5 |

The above reactants were refluxed with stirring for 2 hours. 200 grams of xylene were then added and the whole cooled to 90–100° C., and the NaOH neutralized with 10 cc. glacial acetic acid in 100 cc. H₂O. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—soft, tacky, pale yellow
Heated to 190° C.—hard, fairly brittle, pale yellow—low melting point
Heated to 200° C.—hard, fairly brittle, pale yellow—105–115° C. melting point
Heated to 225° C.—hard, brittle, amber—120–125° C. melting point
Heated to 250° C.—hard, brittle, dark amber—128–135° C. melting point
Heated to 275° C.—very brittle, deep brown—155–160° C. melting point The above distillation was without the use of vacuum. It illustrates that heating alone, or heating with vacuum, changes a low-stage resin into a medium or high-stage resin.

Example 61a

This resin was obtained by the vacuum distillation of resin of Example 3a. Vacuum distillation was conducted up to 250° C. at 25 mm. Hg. The resulting resin was hard, brittle, amber colored, and had a slightly higher melting point than the resin prior to vacuum distillation, to wit, 140–145° C. It was xylene-soluble. The molecular weight, determined cryoscopically using benzene, was approximately 1400.

Example 62a

This resin was obtained by the vacuum distillation of resin of Example 8a. Vacuum distillation was conducted up to 225° C. at 25 mm. Hg. The resulting resin was xylene-soluble, hard, brittle, reddish black in color, with a melting point of 140–145° C. Note that this resin, prior to vacuum distillation, was soft to pliable in consistency.

Example 63a

This resin was obtained by the vacuum distillation of resin of Example 10a. Vacuum distillation was conducted up to 225° C. at 25 mm. Hg. The resulting resin was xylene-dispersible, soluble in a mixture of xylene and diethyleneglycol diethylether, dark brown in color, and hard and brittle in nature. It had a melting point of 180–185° C. This was moderately higher than the resin prior to vacuum distillation.

Example 64a

This resin was obtained by the vacuum distillation of resin of Example 9a. Vacuum distillation was conducted up to 225° C. at 25 mm. Hg. The resulting resin was semi-hard but still contained some diethyleneglycol diethylether. Unquestionably, if completely separated from this solvent it would have been a hard solid resin. Such residual solvent was not eliminated lest there be danger of pyrolysis.

Example 65a

This resin was obtained by the vacuum distillation of resin of Example 16a. Vacuum distillation was conducted up to 225° C. at 25 mm. Hg. The resulting resin had the same physical characteristics as the undistilled resin except that it was slightly more viscous.

Example 66a

This resin was obtained by the vacuum distillation of resin of Example 15a. Vacuum distillation was conducted up to 225° C. at 25 mm. Hg. The resulting resin was semi-hard to pliable.

Example 67a

This resin was obtained by the vacuum distillation of resin of Example 20a. Vacuum distillation was conducted up to 225° C. at 25 mm. Hg. The resulting resin was hard to pliable.

In the immediately preceding examples describing the production of resins by the vacuum distillation of resins of earier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds which have little tendency to form rubbery derivatives during oxyethylation.

Example 68a

| | Grams |
|---|---|
| Commercial para-tertiary amylphenol (described in Example 5a) | 164 |
| Formaldehyde | 81 |
| Monoalkyl (C₁₀–C₂₀, principally C₁₂–C₁₄) benzene monosulfonic acid sodium salt | .8 |
| Xylene | 200 |

No catalyst was added in this example. The reactants were placed in an autoclave and stirred while heating to a temperature of approximately 160° C. The total period of reaction was 5½ hrs. During the early part of this period the temperature was 156° C. with a gauge pressure of 110 pounds. During the last part of the period, probably due to the absorption of formaldehyde, the pressure dropped to 75 pounds gauge pressure while the temperature held at about 150° C. After this 5½ hour reaction period the autoclave was allowed to cool. The liquids were withdrawn and the xylene solution of the resin was decanted away from the small aqueous layer. The xylene solution, containing a bit of the aqueous layer carried over mechanically, was subjected to vacuum distillation up to 150° C. at 25 mm. Hg.

The resulting resin was fairly hard and brittle, xylene-soluble, dark, amber in color, with a melting point of 55° to 66° C., and a molecular weight of 490. If desired, one may use considerably higher pressure so as to speed up the reaction and also in order to obtain resins of higher molecular weight. We have employed the same procedure with moderately higher temperatures and definitely higher pressures.

As far as the manufacture of resins is concerned it is usually most convenient to employ a catalyst such as illustrated by previous examples.

Previous reference has been made to the use of a single phenol as herein specified or a single reactive aldehyde or a single oxyalkylating agent. Obviously, mixtures of reactants may be employed, as for example a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins, in what would actually be a mechanical mixture, although such mixture might exhibit some unique properties as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the use of oxyalkylated derivatives of such resins, derived from such plurality of reactants instead of being limited to a single reactant from each of the three cases, is contemplated and here included for the reason that they are obvious variants.

Having obtained a suitable resin of the kind described, such resin is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. The olefin oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from lowstage resins, i. e., of 3 and up to and including 7 units per molecule.

If a xylene solution is used in an autoclave as hereinafter indicated, the pressure readings of course represent total pressure, that it, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable ractant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin as such, or in the form of a solution as described, is then treated with ethylene oxide in presence of 0.5% to 2% of sodium methylate as a catalyst in step-wise fashion. The conditions of reaction, as far as time or per cent are concerned, are within the range previously indicated. With suitable agitation the ethylene oxide, if added in molecular proportion, combines within a comparatively short time, for instance a few minutes to 2 to 6 hours, but in some instance requires as much as 8 to 24 hours. A useful temperature range is from 125° to 225° C. The completion of the reaction of each addition of ethylene oxide in stepwise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin to as much as five or six times the weight of the original resin. In the case of a resin derived from para-tertiary butylphenol, as little as 50% by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the stepwise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl. With such information one is in substantially the same position as if one had personally made the resin prior to oxyethylation.

For instance, the molecular weight of the internal structural units of the resin of the following over-simplified formula:

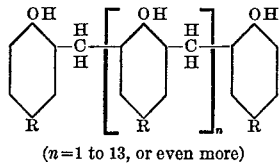

($n=1$ to 13, or even more)

is given approximately by the formula: (mol. wt. of phenol $-2$) plus mol. wt. of methylene or substituted methylene radical. The molecular weight of the resin would be $n$ times the value for the internal limit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

The following examples, 1b through 9b, are included to exemplify the production of suitable oxyalkylation products from resins, specifically, resins described in nine of the foregoing Examples 1a–68a, giving exact and complete details for the carrying out of the procedure. In the table which appears further on in the specification are given data with respect to the oxyethylation of a number of the resins previously described, it being understood that in preparing the products referred to in the table the manipulative steps used are those of Examples 1b–9b.

*Example 1b*

The resin employed is the acid-catalyzed paratertiary butylphenol-formaldehyde resin of Example 1a. (Such resin can be purchased in the open market.) The resin is powdered and mixed with an equal weight of xylene so as to obtain solution by means of a stirring device employing a reflux condenser. 170 grams of the resin are dissolved in or mixed with 170 grams of xylene. To the mixture there is added 1.7 grams of sodium methylate powder. The solution or suspension is placed in an autoclave and approximately 400 grams of ethylene oxide by weight are added in 6 portions of approximately 65 to 75 grams each. After each portion is added, the reaction is permitted to take place for approximately 4 hours. The temperature employed is approximately 150° to 165° C. and a maximum gauge pressure of approximately 150 pounds per square inch. The minimum gauge pressure is approximately 20 pounds per square inch. At the end of each 4-hour period there is no further drop in pressure, thus indicating that all the ethylene oxide present has reacted and the pressure registered on the gauge represents the vapor pressure of xylene at the indicated temperature. After the sixth and final portion of ethylene oxide has been added, a test is made on the resultant.

In one such operation, the resultant, when cold, was a viscous opaque liquid, emulsifiable in water even in presence of the added xylene. This indicated that incipient emulsification in absence of xylene probably appeared at the completion of the fourth addition of ethylene oxide. In other words, 150 grams or 175 grams of ethylene oxide are sufficient to give incipient hydrophile properties in absence of xylene. The initial point approximates ethylene oxide equal to slightly less than 100% of the weight of the initial resin. In this instance in order to obtain greater solubility, the amount of ethylene oxide used for reaction was increased by a second series of additions using substantially the same conditions of reaction as noted previously. Such series was continued until, as an upper limit, 500 grams of ethylene oxide had been introduced on the basis of the original 170 grams of resin. See the attached table for data as to the compound in which the ratio of ethylene oxide to resin is about 2:1. A compound of this constitution, containing a small amount of xylene, was light amber in color, miscible with water and had a viscosity resembling that of castor oil.

Example 2b

The same reactants, and procedure were employed as in Example 1b preceding, except that propylene oxide was employed instead of ethylene oxide. The resultant, even on the addition of the alkylene oxide in the weight proportions of the previous example, has diminished hydrophile properties in comparison with the resultants of Example 1b. This illustrates the point that propylene oxide and butylene oxide give products of lower levels of hydrophile properties than does ethylene oxide.

Example 3b

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide for the reason that disastrous results may be obtained even in experimentation with laboratory quantities.

Example 4b

The same procedure is followed as in Example 1b except that instead of employing the resin employed in Example 1b, there was substituted instead an equal weight of resin of Example 2a. The products obtained were similar in appearance, color and viscosity to those of Example 1b.

Example 5b

The same reactants and procedure are employed as in Example 1b, except that the acid catalyzed amylphenol formaldehyde resin of Example 3a is used. (Such resin can be purchased in the open market.) Suitable amylphenol resins include those of Examples 4a, 5a and 6a. The oxyethylated products in color, appearance, viscosity, etc., are like the products of Example 1b.

Example 6b

The same reactants and procedure are employed as in Example 1b, except that the acid-catalyzed octylphenol-formaldehyde resin of Example 8a is used instead of the butylphenol resin. As far as we are aware such resins are not offered for sale in the open market but may be. The products obtained are very desirable, and in color, appearance, viscosity, etc., resemble the products of Example 1b.

Example 7b

The same reactants and procedure are employed as in Example 1b, except that the acid-catalyzed hydroxydiphenyl (phenylphenol) resin of Example 9a is used in place of the butylphenol resin. (Such resin can be purchased in the open market.) The appearance of the oxyethylated products is similar to that of the products of Example 1b except that the color is distinctly darker. The solubility of the products is less than that of the products of Example 1b and the products do not seem to give quite as good dispersions or solutions.

Example 8b

The same reactants and procedure are employed as in Example 1b, except that the acid-catalyzed cyclohexylphenol resin of Example 10a is substituted for the butylphenol resin. Methyl-cyclohexylphenol resin, used instead of the butylphenol, also gives excellent products. One can manufacture a methylcyclohexylphenol resin following the procedure of Example 10a. The oxyethylated products of this example are similar in appearance and solubility to the products of Example 1b, but are somewhat more viscous.

Example 9b

The same reactants and procedure were employed as in Example 1b, except that the acid-catalyzed styrylphenol-formaldehyde resin of Example 11a was used instead of the butylphenol resin. The oxyethylated products are similar in appearance, color, solubility, etc., to the products of Example 1b.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

The same procedure as described above has been applied to a large variety of resins of the kind described previously, including resins obtained from mixtures of phenols, and we have found that these oxyalkylated products having the required minimum hydrophile properties, are all effective for use in the process of the invention. In many cases resins used were obtained from aldehydes other than formaldehyde, i. e., higher aldehydes having not over 8 carbon atoms. Similarly, some of the resins instead of being obtained by use of acid catalysts were obtained by use of alkaline catalysts or sequential use of both types of catalyst. In some instances the resins were obtained by a process which involved a secondary step of heating alone or under vacuum. In the series of examples represented by Examples 1b through 9b, the amount of alkylene oxide added covers the range up to about three times the weight of the initial resin. The data given in the table which follows show that many of the most effective compounds for demulsification purposes require but about one-half this amount of alkylene oxide, in particular, ethylene oxide, for example, from 150% to possibly 200% by weight. Larger amounts of ethylene oxide, for example, amounts up to six times the weight of the initial resin may be used, even though the solubility of such products may in some cases be less than the solubility of derivatives obtained with lesser amounts of alkylene oxide.

The table which follows gives data with respect to the preparation and properties of a series of oxyethylated resins which have been tested for demulsifying properties against selected California crude oil emulsions. Each product was obtained by the oxyethylation of a product of one of Examples 1a through 68a. The tabulated data include the example number, in which the preparation of the resin is described and the resin is identified, the amount of ethylene oxide added per weight of resin, the amount and nature of the catalyst used for the oxyethylation operations, the number of steps in which the oxyethylation was carried out, the hydrophile properties not only of the final product but of intermediate products, the temperatures used in the oxyethylation steps, the maximum pressures (gauge) of the oxyethylation steps and the length of time required for each step. The technique used was that described in Example 1b.

In the table the compounds are listed in about the order of decreasing effectiveness in the demulsification of the selected California crude oil emulsions. It is to be understood that the compounds are highly effective for the treatment of emulsions from other sources, for desalting operations, treatment of tank bottoms and the like, and their relative effectiveness for such purposes is not necessarily the same as their relative effectiveness for the treatment of the selected California emulsions. In evaluating the relative effectiveness of the materials, the three criteria used were the ratio of demulsifying agent to emulsion required, the speed of the demulsification, and the cleanliness of the demulsified oil, that is, its content of B. S. & W.

In the table, the first column on each page gives the example number, thus identifying the resin used. Column A gives the weight of the resin solution used in grams, column B the percentage of solvent in the resin solution used, column C the per cent of alkaline catalyst (sodium methylate) based on amount of resin used in the oxyethylation. Columns $D_1$ through $H_6$ give the data with respect to the oxyethylation operations, column $D_1$ giving the maximum temperature in degrees C., column $E_1$ the gauge pressure in pounds per square inch, column $F_1$ the number of grams of ethylene oxide added in the first addition, column $G_1$ the time required for the first addition in hours, and column $H_1$ the hydrophile properties of the product resulting from the first addition. Columns $D_2$ through $H_2$ give similar data for the second addition of ethylene oxide, columns $D_3$ through $H_3$ similar data for the third addition, etc.

*Table*

| Example | Resin | | | Additions of Ethylene Oxide | | | | | | | | | |
|---|---|---|---|---|---|---|---|---|---|---|---|---|---|
| | | | | First Addition | | | | | Second Addition | | | | |
| | A | B | C | $D_1$ | $E_1$ | $F_1$ | $G_1$ | $H_1$ | $D_2$ | $E_2$ | $F_2$ | $G_2$ | $H_2$ |
| 5a | 521.6 | 50.0 | 1.92 | 166 | 95 | 129.0 | 1 | Insoluble | 160 | 100 | 54.3 | 1½ | Emulsifiable. |
| 11a | 449.4 | 36.4 | 1.75 | 146 | 110 | 100.0 | 16 | ___do___ | 160 | 155 | 100.0 | 5⅚ | Do. |
| 38a | 328.5 | 43.6 | 1.90 | 150 | 125 | 100.0 | 2⅛ | Emulsifiable | 152 | 125 | 100.0 | ⅚ | Do. |
| 68a | 200.0 | 50.0 | 3.50 | 150 | 109 | 50.0 | 5 | ___do___ | 152 | 140 | 50.0 | 3¼ | Do. |
| 16a | 400.0 | 50.0 | 1.00 | 152 | 125 | 100.0 | 8 | ___do___ | 154 | 140 | 100.0 | 8 | Do. |
| 26a | 290.0 | 27.4 | 1.70 | 135 | 145 | 110.0 | 2 | Dispersible | 135 | 145 | 100.0 | 1½ | Do. |
| 28a | 297.5 | 37.8 | 2.00 | 150 | 140 | 100.0 | 1⅙ | ___do___ | 140 | 100 | 110.0 | ⅚ | Do. |
| 35a | 249.0 | 34.2 | 2.42 | 144 | 150 | 100.0 | 3⅔ | Emulsifiable | 146 | 170 | 100.0 | 2 | Do. |
| 50a | 291.0 | 50.0 | 2.07 | 156 | 175 | 100.0 | 5 | ___do___ | 160 | 110 | 100.0 | 5 | Do. |
| 8a | 221.8 | 48.0 | 1.73 | 138 | 110 | 50.0 | 5¾ | ___do___ | 145 | 135 | 65.0 | 7 | Do. |
| 15a | 158.0 | 36.0 | 1.98 | 150 | 140 | 50.0 | 10 | ___do___ | 110 | 125 | 50.0 | 4 | Do. |
| 4a | 217.8 | 37.6 | 1.13 | 130 | 135 | 100.0 | 6 | ___do___ | 136 | 140 | 100.0 | 9 | Becoming Soluble. |
| 20a | 149.0 | 30.0 | 3.00 | 137 | 135 | 50.0 | 3½ | ___do___ | 137 | 140 | 50.0 | 1½ | Emulsifiable. |
| 22a | 297.0 | 42.4 | 2.90 | 135 | 140 | 110.0 | 1⅚ | ___do___ | 135 | 140 | 110.0 | 1 | Almost Soluble. |
| 36a | 254.0 | 34.2 | 1.80 | 140 | 125 | 100.0 | 3 | ___do___ | 146 | 175 | 100.0 | 31¼ | Emulsifiable. |
| 39a | 299.4 | 26.4 | 2.96 | 150 | 130 | 100.0 | 7 | Insoluble | 152 | 130 | 100.0 | 1¼ | Do. |
| 40a | 279.0 | 27.4 | 1.98 | 145 | 150 | 100.0 | 2 | Dispersible | 150 | 150 | 100.0 | 1⅙ | Do. |
| 41a | 310.5 | 23.8 | 1.90 | 148 | 140 | 100.0 | 4½ | ___do___ | 150 | 150 | 100.0 | 1¾ | Do. |
| 1a | 400.0 | 50.0 | 1.00 | 140 | 170 | 100.0 | 7 | Emulsifiable | 160 | 180 | 100.0 | 7 | Do. |
| 17a | 216.5 | 34.0 | 2.10 | 140 | 80 | 100.0 | 1 | ___do___ | 152 | 135 | 100.0 | 9 | Do. |
| 24a | 291.0 | 26.5 | 1.87 | 150 | 120 | 100.0 | 5 | ___do___ | 160 | 120 | 100.0 | 7 | Do. |
| 29a | 175.0 | 28.3 | 1.43 | 140 | 85 | 100.0 | 3 | Insoluble | 150 | 135 | 100.0 | 6 | Becoming Soluble. |
| 34a | 298.5 | 41.4 | 2.00 | 140 | 95 | 100.0 | 7 | Emulsifiable | 144 | 115 | 100.0 | 4 | Emulsifiable. |
| 10a | 40.0 | 42.5 | 2.00 | 150 | 100 | 50.0 | 6 | Soluble | | | | | Do. |
| 12a | 267.0 | 37.7 | 1.81 | 150 | 140 | 100.0 | 4 | Emulsifiable | 154 | 140 | 100.0 | 5 | Do. |
| 6a | 258.5 | 46.0 | 2.14 | 150 | 80 | 100.0 | 3 | ___do___ | 150 | 100 | 100.0 | 6 | Do. |
| 27a | 338.0 | 27.2 | 1.60 | 144 | 135 | 110.0 | ⅚ | ___do___ | 148 | 100 | 100.0 | ⅚ | Do. |
| 42a | 200.0 | 50.0 | 2.00 | 115 | 104 | 50.0 | 2 | Insoluble | 130 | 95 | 50.0 | 2 | Do. |
| 44a | 200.0 | 50.0 | 2.00 | 128 | 100 | 100.0 | 3 | Emulsifiable | 146 | 90 | 100.0 | 2 | Do. |
| 9a | 377.0 | 61.0 | 2.04 | 150 | 150 | 100.0 | 2½ | Insoluble | 150 | 150 | 100.0 | 12 | Do. |
| 19a | 219.0 | 33.8 | 2.76 | 130 | 140 | 100.0 | 2½ | Emulsifiable | 132 | 150 | 100.0 | 1½ | Soluble. |
| 21a | 402.0 | 54.5 | 2.70 | 154 | 120 | 100.0 | 5 | ___do___ | 158 | 170 | 110.0 | 4⅔ | Emulsifiable. |
| 23a | 484.0 | 24.6 | 1.50 | 130 | 150 | 100.0 | 6 | ___do___ | 135 | 140 | 100.0 | 3 | Do. |
| 32a | 353.0 | 39.2 | 1.86 | 141 | 90 | 100.0 | 1 | Insoluble | 142 | 70 | 100.0 | ½ | Do. |
| 2a | 481.0 | 47.6 | 1.59 | 154 | 125 | 100.0 | 2½ | ___do___ | 160 | 90 | 100.0 | 5 | Do. |
| 13a | 283.8 | 44.0 | 1.89 | 148 | 145 | 100.0 | 6 | Emulsifiable | 146 | 105 | 100.0 | 6 | Do. |
| 14a | 400.0 | 50.0 | 2.50 | 140 | 125 | 100.0 | 24 | ___do___ | 160 | 140 | 100.0 | 24 | Do. |
| 30a | 255.0 | 29.5 | 2.20 | 144 | 160 | 100.0 | 6⅙ | Dispersible | 150 | 130 | 100.0 | 2½ | Do. |
| 31a | 414.0 | 35.5 | 1.87 | 150 | 130 | 100.0 | 1⅚ | ___do___ | 164 | 154 | 100.0 | ⅔ | Dispersible. |
| 33a | 277.0 | 38.6 | 1.80 | 140 | 160 | 110.0 | 9 | ___do___ | 140 | 130 | 100.0 | 3 | Emulsifiable. |
| 37a | 544.0 | 44.0 | 2.20 | 142 | 130 | 110.0 | ⅚ | Emulsifiable | 140 | 125 | 110.0 | ⅔ | Do. |

Table—Continued

| Example | Additions of Ethylene Oxide ||||| |||||
|---|---|---|---|---|---|---|---|---|---|---|
| | Third Addition ||||| Fourth Addition |||||
| | D₃ | E₃ | F₃ | G₃ | H₃ | D₄ | E₄ | F₄ | G₄ | H₄ |
| 5a | 162 | 100 | 45.0 | 3½ | Emulsifiable | 152 | 90 | 36.6 | 2⅓ | Emulsifiable. |
| 11a | 160 | 155 | 100.0 | 4⅝ | do | 158 | 100 | 100.0 | 4 | Do. |
| 38a | 154 | 140 | 120.0 | ⅔ | Soluble | | | | | |
| 68a | 115 | 124 | 50.0 | 3 | Becoming Soluble | 141 | 100 | 50.0 | 2 | Soluble. |
| 16a | 166 | 110 | 100.0 | 5 | Emulsifiable | 170 | 90 | 100.0 | 4 | Do. |
| 26a | 130 | 140 | 100.0 | 1⅙ | Almost Soluble | 135 | 95 | 50.0 | 1 | Do. |
| 28a | 155 | 100 | 110.0 | ½ | do | 140 | 30 | 70.0 | ½ | Do. |
| 35a | 145 | 135 | 100.0 | 1⅙ | Soluble | | | | | |
| 50a | 150 | 120 | 100.0 | 5 | do | | | | | |
| 8a | 140 | 130 | 50.0 | 7 | Becoming Soluble | 134 | 127 | 50.0 | 6 | Becoming Soluble. |
| 15a | 145 | 128 | 50.0 | 3 | do | 140 | 90 | 50.0 | 2 | Soluble. |
| 4a | 140 | 150 | 100.0 | 8 | Soluble | | | | | |
| 20a | 140 | 120 | 50.0 | 1 7/12 | do | | | | | |
| 22a | 135 | 110 | 50.0 | 1½ | do | | | | | |
| 36a | 140 | 150 | 100.0 | 2⅓ | do | | | | | |
| 39a | 164 | 100 | 100.0 | ⅔ | Emulsifiable | 160 | 100 | 75.0 | ½ | Almost Soluble. |
| 40a | 150 | 150 | 100.0 | 1⅙ | Becoming Soluble | 145 | 90 | 50.0 | 1¼ | Becoming Soluble. |
| 41a | 150 | 125 | 100.0 | 1 | Emulsifiable | 154 | 125 | 100.0 | 1 | Almost Soluble. |
| 1a | 160 | 165 | 100.0 | 7 | Soluble | | | | | |
| 17a | 146 | 100 | 100.0 | 5 | Emulsifiable | 152 | 120 | 100.0 | 6 | Soluble. |
| 24a | 160 | 120 | 100.0 | 6¾ | Almost Soluble | 160 | 125 | 100.0 | 5 | Do. |
| 29a | 150 | 125 | 100.0 | 6 | Soluble | | | | | |
| 34a | 160 | 85 | 100.0 | 4 | do | | | | | |
| 12a | 150 | 165 | 100.0 | 8¾ | Almost Soluble | 150 | 85 | 100.0 | 3 | Do. |
| 6a | 140 | 110 | 100.0 | 5 | Soluble | | | | | |
| 27a | 150 | 100 | 100.0 | ⅔ | Becoming Soluble | 141 | 60 | 60.0 | ¾ | Almost Soluble. |
| 42a | 120 | 96 | 50.0 | 1 | Soluble | | | | | |
| 44a | 148 | 120 | 100.0 | 4¼ | do | | | | | |
| 9a | 120 | 75 | 100.0 | 1 | Emulsifiable | 148 | 80 | 100.0 | 1½ | Emulsifiable. |
| 21a | 158 | 160 | 110.0 | 4 | Soluble | | | | | |
| 23a | 135 | 152 | 100.0 | 2¾ | Emulsifiable | 135 | 140 | 110.0 | 1½ | Soluble. |
| 32a | 138 | 135 | 100.0 | 2 | Becoming Soluble | 146 | 150 | 100.0 | 1½ | Do. |
| 2a | 160 | 130 | 100.0 | 6 | Emulsifiable | 160 | 140 | 100.0 | 6 | Becoming Soluble. |
| 13a | 154 | 140 | 100.0 | 8 | do | 156 | 160 | 100.0 | 8 | Emulsifiable. |
| 14a | 160 | 100 | 100.0 | 20 | Almost Soluble | 154 | 154 | 100.0 | 20 | Soluble. |
| 30a | 148 | 180 | 100.0 | 3 | Becoming Soluble | 146 | 170 | 100.0 | 1⅙ | Do. |
| 31a | 158 | 120 | 110.0 | ½ | Emulsifiable | 150 | 125 | 110.0 | ½ | Almost Soluble. |
| 33a | 140 | 170 | 50.0 | 1½ | Soluble | | | | | |
| 37a | 150 | 145 | 110.0 | ⅔ | Emulsifiable | 136 | 50 | 75.0 | ½ | Soluble. |

| Example | Fifth Addition ||||| Sixth Addition ||||
|---|---|---|---|---|---|---|---|---|---|
| | D₅ | E₅ | F₅ | G₅ | H₅ | D₆ | E₆ | F₆ | G₆ | H₆ |
| 5a | 156 | 100 | 27 | 7 | Almost Soluble | 140 | 75 | 17 | 4 | Soluble. |
| 11a | 158 | 115 | 100 | 5 | Soluble | | | | | |
| 8a | 136 | 108 | 50 | 6 | Almost Soluble | 143 | 130 | 50 | 7 | Do. |
| 40a | 140 | 80 | 50.0 | 1 1/12 | Soluble | | | | | |
| 27a | 142 | 60 | 60.0 | 7/12 | Almost Soluble | | | | | |
| 9a | 150 | 85 | 100 | 1¾ | Emulsifiable | | | | | |
| 2a | 160 | 105 | 60 | 6 | Soluble | | | | | |
| 31a | 160 | 100 | 110.0 | ½ | do | | | | | |

In appearance, the final oxyethylated products, in the presence of the solvent, were, in general, liquids of varying viscosities, and varied in color from light amber to dark brown. Thus, the final products derived from the resins of Examples 1a, 2a, 5a, 8a, 9a and 11a were light amber colored liquids somewhat resembling castor oil in viscosity. The products obtained from the resins of Examples 10a, 32a and 50a were viscous, light amber colored liquids having a viscosity similar to that of lightly blown castor oil. The products from the resins of Examples 12a, 13a, 14a, 15a, 16a, 17a, 4a, 20a, 21a, 22a, 23a, 24a and 6a were relatively non-viscous, amber colored liquids slightly less viscous than castor oil, and the product derived from the resin of Example 19a was a red amber liquid somewhat less viscous than castor oil. The product from the resin of Example 26a was a red amber liquid having a viscosity similar to that of lightly blown castor oil. The product from the resin of Example 27a was turbid, light amber and like lightly blown castor oil in viscosity. The products derived from the resins of Examples 28a, 35a and 37a were non-viscous and red in color, while the products derived from the resins of Examples 29a and 36a were non-viscous and light amber or light red amber in color. The products derived from the resins of Examples 30a, 31a and 33a were light amber colored liquids having a viscosity similar to that of medium blown castor oil. The products from the resins of Examples 34a and 38a were non-viscous and light amber in color, while the products from the resins of Examples 39a, 40a, 41a and 42a were non-viscous and reddish black or dark brown in color, the last being somewhat coagulated. The products from the resins of Examples 68a and 44a were non-viscous, amber colored liquids.

The foregoing description of the appearance, viscosity, etc., of the final oxyethylated products with respect to which data are given in the table relates to the properties of the products in the presence of the solvent. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc."

Having purchased or prepared the four types of materials employed to give the herein contemplated mixture, one need only mix such materials either in the absence of a solvent or in the presence of a solvent. I prefer to prepare the final mixture in the form of a liquid of viscosity somewhat resembling castor oil. This generally means the addition of about 20% of a solvent, such as xylene, petroleum aromatic solvent, or a mixture of the above with an alcohol, such as isopropyl alcohol, butyl alcohol, or amyl alcohol. Other solvents of the aromatic or polar, or semi-polar type may be employed. The particular solvent is immaterial. I prefer to use, however, a mixture consisting of 75% of a high boiling aromatic solvent, such as xylene, tar acid oil, high boiling petroleum aromatic solvent obtained by cracking, together with 25 per cent of an alcohol, such as isopropyl alcohol, butyl alcohol, or isobutyl alcohol.

If the mixture is prepared in the absence of a solvent, my preference is simply to mix the ingredients in the proportion subsequently shown, place in a steam-jacketed mixer, and heat to make the mixture sufficiently fluid. The mixed mass will generally melt or soften at somewhere around 45° to 75° C. Being a mixture, it has no definite melting point but rather a softening point over a fairly wide range. Generally speaking, all the ingredients are fluid enough at 80° to 100° C. to mix together rapidly. When softened and thoroughly mixed so as to give a homogeneous mass, the product can be employed as such, or if desired, a solvent can be added so that the mixture with such added solvent is permanently liquid. This makes it convenient for easy handling. As previously stated, I prefer to select proportions so that the finished product contains 80% active material and 20% solvent. However, this can be varied over any suitable range. For instance, one might use an equal amount of solvent and active material. This is simply a matter of convenience. The invention is concerned primarily with the mixture per se and its use.

In actual preparation I have found it most convenient to prepare one of the products with a suitable amount of solvent present. For instance, I prefer to prepare the oxyethylated derivative so that it contains 50% of the derivative and 50% of a solvent. This solvent is a high boiling aromatic solvent of the kind previously described. In such case I merely add the four ingredients (the oxyethylated ingredient containing solvent) in a vessel equipped with a reflux condenser and heat sufficiently to dissolve the entire mass and prevent the escape of any of the solvent. When everything is dissolved, the liquid mass is mixed for a short period of time to insure absolute and complete solution.

The following table indicates the four components (exclusive of the solvent) and the range which they may be employed in the herein contemplated invention. The percentages, as stated, are based on the mixture in absence of solvent.

| Ingredient | Minimum, per cent | Maximum, per cent | Preferred, per cent | Preferred mixture with water 20% solvent |
|---|---|---|---|---|
| Oxyethylated Compound | 20 | 30 | 25 | 20 |
| Cyclohexylamine Salt | 25 | 35 | 30 | 24 |
| Ammonium Salt | 25 | 35 | 30 | 24 |
| Mahogany Soap | 10 | 20 | 15 | 12 |
| Solvent | | | | 20 |

The above are based on weight.

Thus, to prepare any preferred mixture, I obtain an oxyethylated derivative of the kind described consisting of 50% derivative and 50% solvent. This particular solvent employed is the 75% high boiling aromatic solvent and 25% isopropyl alcohol. In preparing my mixture I use 50 parts by weight of the solvent diluted oxyethylated derivative as exemplified by oxyalkylated derivative of a phenol-aldehyde resin obtained from an acid-catalyzed para-tertiary phenolformaldehyde resin as described under the heading "Example 5b" preceding, with reference back to resin "Example 3a," preceding (equivalent to 25 parts on a solvent free basis), 30 parts of a cyclohexylamine salt, 30 parts of the ammonium salt, and 15 parts of the sodium mahogany soap. This adds up to 125 parts of which 100 are active material and 25 are solvent—that is, 80 parts active material and 20 parts solvent.

The above table also shows my preferred mixture calculated to a basis containing 20% solvent.

My preferred variants of the above mixture are as follows: To replace the oxyethylated resin by a somewhat different type, for instance the type exemplified by oxyalkylated derivatives of phenol-aldehyde resins as exemplified by "Examples 1b, 2b, 3b, 4b, 6b, 7b, 8b, and 9b" as well as others described in tabular form in the earlier part of this text which has been quoted from the De Groote and Keiser application, Serial No. 8,730, filed February 16, 1948. Another variant consists of using the potassium or ammonium mahogany soap instead of the sodium mahogany soap. My preferred cyclohexylamine salt and preferred ammonium salt is obtained from propylated naphthalene acid in which there are at least 2 and not over 3 propyl groups introduced in each naphthalene nucleus.

As previously stated, the above mixture is of distinct value in treating emulsions of the water-in-oil type, particularly petroleum emulsions. However, such mixture is also of value for other purposes. I have found that the mixture above described is of distinct value as a break inducer in doctor treatment of the kind indicated to sweeten gasoline (see U. S. Patent No. 2,157,223, dated May 9, 1939 to Sutton). I have also found that the above product has use as an emulsifying agent in preparing cresylic acid or similar emulsions for various purposes, such as are used for cattle dip or the like.

Materials of the kind herein contemplated are useful as wetting, detergent, and leveling agents in the laundry, textile, and dyeing industries; as wetting agents and detergents in the acid washing of fruit; in the acid washing of building stone and brick; as a wetting agent and spreader in the application of asphalt in road building and the like; as a constituent of soldering flux preparations; as a flotation reagent in the flocculation separation of various minerals; for flocculation and coagulation separation of various minerals; for flocculation and coagulation of various aqueous suspensions containing negatively charged particles such as sewage, coal washing waste water, and various trade wastes, and the like; as germicides, insecticides, emulsifiers for cosmetics, spray oils, water repellent textile finish, etc. These uses are by no means exhaustive.

Particular mention is made in respect to the use of these products in the removal of mud sheaths as described in U. S. Patent No. 2,135,909 dated November 8, 1938, to Monson.

Conventional demulsifying agents employed in the treatment of oil field emulsions are used as such, or after dilution with any suitable solvent, such as water, and petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum etc., may be employed as diluents. Similarly, the material or materials employed as the demulsifying agent of my process, may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000 or even 1 to 30,000 or even 1 to 40,000 or 1 to 50,000 in desalting practice, such an apparent insolubility in oil and water is not significant because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at somewhat lower cost than is possible with other available demulsifiers, or conventional mixtures thereof. It is believed that the particular demulsifying agent or treating agent herein described, will find comparatively limited application as far as the majority of oil field emulsions are concerned; but I have found that such a demulsifying agent has commercial value as it will economically break or resolve oil field emulsions in a number of cases which cannot be treated as easily or at so low a cost with the demulsifying agents heretofore available.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

Having thus described my invention, what I claim as new and desire to secure by Letters Patent, is:

1. A process for breaking petroleum emulsions of the water-in-oil type, characterized by subjecting the emulsion to the action of a mixture containing as active constituents (A) twenty percent to thirty percent hydrophile, synthetic products; said hydrophile, synthetic products being oxyalkylation products of (a) an alpha-beta alkylene oxide having not more than 4 carbon atoms and selected from the class consisting of ethylene oxide, propylene oxide, butylene oxide, glycide, and methylglycide; and (b) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

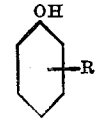

in which R is a hydrocarbon radical having at least 4 and not more than 8 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water; (B) 25% to 35% of a compound of the formula

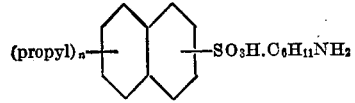

$n=1$ to 4 and $C_6H_{11}NH_2$ is cyclohexylamine (C) 25% to 35% of a compound of the formula

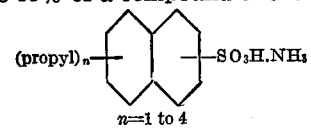

$n=1$ to 4 and (D) oil-soluble alkali metal salt of mahogany petroleum acid, 10% to 20%.

2. A process for breaking petroleum emulsions of the water-in-oil type characterized by subjecting the emulsion to the action of a mixture containing as active constituents (A) twenty percent to thirty percent hydrophile, synthetic products; said hydrophile, synthetic products being oxyethylation products of (a) ethylene oxide, and (b) an oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

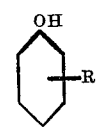

in which R is a hydrocarbon radical having at least 4 and not more than 8 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water; (B) 25% to 35% of a compound of the formula

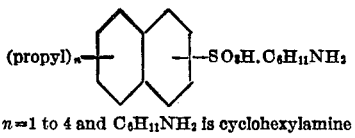

$n=1$ to 4 and $C_6H_{11}NH_2$ is cyclohexylamine (C) 25% to 35% of a compound of the formula

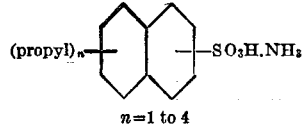

$n=1$ to 4 and (D) oil-soluble alkali metal salt of mahogany petroleum acid 10% to 20%.

3. The process of claim 2 wherein the phenol-aldehyde resin described in the (A) section of claim 2 is a low-stage resin.

4. The process of claim 2 wherein the resin described in the (A) section of claim 2 is a low-stage resin, and the substituent R described in the same section is an aliphatic hydrocarbon radical.

5. The process of claim 2 wherein the resin described in the (A) section of claim 2 is a low-stage resin, the substituent R described in the same section is an aliphatic hydrocarbon radical and the aldehyde described in the same section is an aliphatic aldehyde.

6. A process for breaking petroleum emulsions of the water-in-oil type characterized by subjecting the emulsion to the action of a mixture containing as active constituents (A) twenty percent to thirty percent hydrophile, synthetic products; said hydrophile, synthetic products being oxyalkylation products of (a) ethylene oxide; and (b) an oxyethylation-susceptible, fusible, organic solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula

in which R is an aliphatic hydrocarbon radical having at least 4 and not more than 8 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one of three volumes of water; (B) 25% to 35% of a compound of the formula

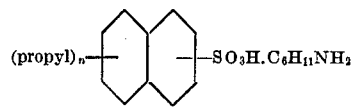

$n=1$ to 4 and $C_6H_{11}NH_2$ is cyclohexylamine (C) 25% to 35% of a compound of the formula

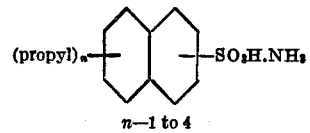

$n=1$ to 4 and (D) oil-soluble alkali metal salt of mahogany petroleum acid, 10% to 20%.

7. A process for breaking petroleum emulsions of the water-in-oil type characterized by subjecting the emulsion to the action of a mixture containing as active constituents (A) twenty percent to thirty percent hydrophile, synthetic products; said hydrophile, synthetic products being oxyethylation product of (a) ethylene oxide; (b) an oxyethylation-susceptible, fusible, organic solvent-soluble, water-insoluble, low-stage, acid-catalyzed phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula

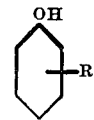

in which R is an aliphatic hydrocarbon radical having at least 4 and not more than 8 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water; (B) 25% to 35% of a compound of the formula

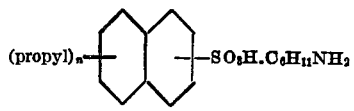

$n=1$ to 4 and $C_6H_{11}NH_2$ is cyclohexylamine (C) 25% to 35% of a compound of the formula

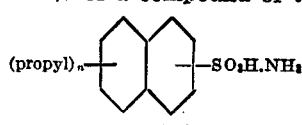

$n=1$ to 4 and (D) oil-soluble alkali metal salt of mahogany petroleum acid 10% to 20%.

8. The process of claim 7 wherein R is substituted in the para position.

9. The process of claim 7 wherein R is a butyl radical substituted in the para postion.

10. The process of claim 7 wherein R is an amyl radical substituted in the para position.

11. The process of claim 7 wherein R is an octyl radical substituted in the para position.

ARTHUR F. WIRTEL.

REFERENCES CITED

The following references are of record in the file of this patent:

UNITED STATES PATENTS

| Number | Name | Date |
| --- | --- | --- |
| 1,867,022 | Munz et al. | July 12, 1932 |
| 1,940,394 | De Groote et al. | Dec. 19, 1933 |
| 2,023,994 | De Groote et al. | Dec. 10, 1935 |
| 2,076,623 | De Groote et al. | Apr. 13, 1937 |
| 2,153,744 | De Groote et al. | Apr. 11, 1939 |
| 2,365,853 | Agruss et al. | Dec. 26, 1944 |
| 2,454,541 | Bock et al. | Nov. 23, 1948 |